(12) United States Patent
Guffarth et al.

(10) Patent No.: US 11,962,075 B2
(45) Date of Patent: Apr. 16, 2024

(54) WIRELESS VEHICLE TO VEHICLE COMMUNICATION SYSTEM FOR MOUNTING ON A VEHICLE

(71) Applicant: ZF Friedrichshafen AG, Friedrichshafen (DE)

(72) Inventors: Christian Guffarth, Friedrichshafen (DE); Johannes Kirchhoff, Friedrichshafen (DE); Alex Hessel, Friedrichshafen (DE); Albertus Clemens Maria Van Der Knaap, Eindhoven (NL); Steven Vanderhaeghen, Eindhoven (NL); Michiel Van Nesselrooij, Eindhoven (NL); Gerardus Henricus Otto Daalderop, Eindhoven (NL); Johannes Joseph Albertus Raaijmakers, Eindhoven (NL)

(73) Assignee: ZF Friedrichshafen AG, Friedrichshafen (DE)

( * ) Notice: Subject to any disclaimer, the term of this patent is extended or adjusted under 35 U.S.C. 154(b) by 197 days.

(21) Appl. No.: 17/312,340

(22) PCT Filed: Dec. 10, 2019

(86) PCT No.: PCT/NL2019/050821
§ 371 (c)(1),
(2) Date: Jun. 9, 2021

(87) PCT Pub. No.: WO2020/122714
PCT Pub. Date: Jun. 18, 2020

(65) Prior Publication Data
US 2021/0336328 A1    Oct. 28, 2021

(30) Foreign Application Priority Data
Dec. 10, 2018    (NL) ...................... 2022163

(51) Int. Cl.
*H01Q 1/32* (2006.01)
*B60R 1/12* (2006.01)
(Continued)

(52) U.S. Cl.
CPC ............. *H01Q 1/3266* (2013.01); *B60R 1/12* (2013.01); *G08G 1/22* (2013.01); *H01Q 1/3283* (2013.01);
(Continued)

(58) Field of Classification Search
CPC ........... H01Q 32/3208; H01Q 32/3216; H01Q 32/3266; H01Q 32/3283; H01Q 32/3291
See application file for complete search history.

(56) References Cited

U.S. PATENT DOCUMENTS 10,074,894 B1 *  9/2018  Birnbaum ............... H01Q 21/10
2010/0309066 A1  12/2010  Flick et al.
(Continued)

FOREIGN PATENT DOCUMENTS

DE    102010029465           12/2011
DE    102010029465 A1 * 12/2011  ............. H04L 67/12
(Continued)

OTHER PUBLICATIONS

International Search Report and Written Opinion issued in corresponding PCT Application No. PCT/NL2019/050821 completed on Feb. 7, 2020, and dated Feb. 17, 2020 (12 pages).
(Continued)

*Primary Examiner* — Daniel Munoz
(74) *Attorney, Agent, or Firm* — Crowell & Moring LLP (57) ABSTRACT

It is aimed to provide a wireless vehicle to vehicle communication system arranged for mounting on a vehicle's front side location, equipped to provide inter vehicle communication. The system comprises a wing assembly arranged for mounting on the vehicles front side location. The wing
(Continued)

assembly houses one or more digital communications antennas and has a side portion that houses a first antenna at a first height and/or horizontal position, and a second antenna at a second height and/or horizontal position, different from the first height and/or first horizontal position and sufficiently away from the other metallic and/or electronic components, for the purpose of optimizing reception and/or transmission quality, by e.g. providing good coverage and diversity, and avoiding interference with each other.

20 Claims, 7 Drawing Sheets

(51) Int. Cl.
*G08G 1/00* (2006.01)
*H01Q 1/42* (2006.01)
*H01Q 21/28* (2006.01)
*H04W 4/46* (2018.01)

(52) U.S. Cl.
CPC .............. *H01Q 1/42* (2013.01); *H01Q 21/28* (2013.01); *H04W 4/46* (2018.02); *B60R 2001/1253* (2013.01); *B60R 2001/1261* (2013.01)

(56) References Cited

U.S. PATENT DOCUMENTS

| | | |
|---|---|---|
| 2017/0214130 A1 | 7/2017 | Grimes et al. |
| 2018/0337703 A1* | 11/2018 | Price ................... H01Q 1/3266 |
| 2019/0190137 A1* | 6/2019 | Martinez Ortigosa ..................... H01Q 19/10 |

FOREIGN PATENT DOCUMENTS

| | | |
|---|---|---|
| NL | 2022163 | 7/2020 |
| WO | WO 9732355 | 9/1997 |
| WO | WO 2017/196165 A1 | 11/2017 |
| WO | WO 2020/122714 A1 | 6/2020 |

OTHER PUBLICATIONS

Search Report and Written Opinion issued in corresponding NL Application No. NL 2022163 dated Aug. 23, 2019 (11 pages).

* cited by examiner

WIRELESS VEHICLE TO VEHICLE COMMUNICATION SYSTEM FOR MOUNTING ON A VEHICLE

CROSS-REFERENCE TO RELATED APPLICATIONS

This application is a U.S. national stage application under 35 U.S.C. § 371 of PCT Application No. PCT/NL2019/050821 filed on Dec. 10, 2019, and published as WO 2020/122714 A1 on Jun. 18, 2020, which claims priority from Netherlands Application No. 2022163 filed on Dec. 10, 2018, the entirety of which are each hereby fully incorporated by reference herein.

FIELD OF INVENTION

The invention relates to a wireless vehicle to vehicle communication system arranged for mounting on a vehicle's front side location, equipped to provide an inter vehicle communication in particular, for use in platooning of heavy trucks.

DESCRIPTION OF THE PRIOR ART

Platooning, i.e. driving in convoy by two or more trucks, such as trailer truck combinations, substantially increases the fuel efficiency of trucks and relieves the burden for the driver with respect to this highly precise steering and responsible system monitoring task with reduced vision on the road due to short the distance of the vehicle that is followed. Furthermore (road) safety is enhanced as the human factor is diminished or completely eliminated and road usage (meaning more truck-trailers per road length sections) is maximized by short distance driving. Last but not least driver effectiveness can be improved as the driver can do other tasks like administration, resting, etc. during the journey in case of autonomous driving mode. Platooning is the basis for new future automated logistic transport concepts. There is high need to develop and optimize these systems.

State-of-the-art in Advanced Driver Assistance Systems (ADAS), where platooning is part of, applied on-board sensor systems such as cameras and radars have latency times ranging from 200 to 500 ms.

These delay times limit further minimization of vehicle following distance; however: the smaller the inter distance between the following vehicles, the higher the platooning benefit is in terms fuel economy, road use and traffic safety. E.g. the risk of cut-ins by other road users is reduced. To compensate for sensor related 'sluggish' response of the Adaptive Cruise Control (ACC) based vehicle following control systems, vehicle-to-vehicle (V2V) communication is installed. These V2V signals are used to wirelessly (e.g. via WiFi-p) transmit actual vehicle states such as acceleration, deceleration and may be even steering angles from the predecessor to the following vehicles. In this way feed forward information is provided in addition to the basic ACC system in the following vehicle, effectively establishing a fast reacting platooning control system that allows for short distance vehicle following.

In PCT/NL2017/050285 a side mirror system is provided with forward looking cameras provided on the sides of a truck for the purpose of enhanced lane detection as input for the platooning control system. There is a need to provide a vehicle to vehicle communication system, especially for use in case of short distance vehicle following platooning applications in commercial vehicles as described in the aforementioned state-of-the-art, that optimizes the vehicle intercommunication by providing a wireless communication system with communication antennas mounted in an optimal sense. It is aimed to provide a solution that establishes optimal wireless communication between platooning vehicles.

SUMMARY OF THE INVENTION

According to an aspect, it is aimed to provide a wireless vehicle to vehicle communication system arranged for mounting on a vehicle's front side location, equipped to provide inter vehicle communication. The system comprises a wing assembly arranged for mounting on the vehicles front side location. The wing assembly houses one or more digital communications antennas and has a side portion that houses a first antenna at a first height and/or horizontal position, and a second antenna at a second height and/or horizontal position, different from the first height and/or first horizontal position for the purpose of avoiding transmission or reception interference with each other, by providing good coverage, low interference and good diversity properties of the communication signals. The wing shape is optimized for antenna transmission and is provided in an optimized housing that places the antennas at an ulterior distance from the vehicle and electronic interference sources such as digital cameras; while at the same time reducing air resistance and providing sufficient interdistance between the one or more transmission digital communications antennas to optimize reception and transmission qualities.

BRIEF DESCRIPTION OF THE DRAWINGS

The invention will be further elucidated in the figures.

DETAILED DESCRIPTION

Unless otherwise defined, all terms (including technical and scientific terms) used herein have the same meaning as commonly understood by one of ordinary skill in the art to which this disclosure belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be further understood that the terms "comprises" and/or "comprising" specify the presence of stated features but do not preclude the presence or addition of one or more other features. All publications, patent applications, patents, and other references mentioned herein are incorporated by reference in their entirety. In case of conflict, the present specification, including definitions, will control.

While example embodiments are shown for systems and methods, also alternative ways may be envisaged by those skilled in the art having the benefit of the present disclosure for achieving a similar function and result. E.g. some components may be combined or split up into one or more alternative components. Finally, these embodiments are intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the scope of the present systems and methods as set forth in the claims that follow. The specification and drawings are accordingly to be regarded in an illustrative manner and are not intended to limit the scope of the appended claims.

Figure 1:
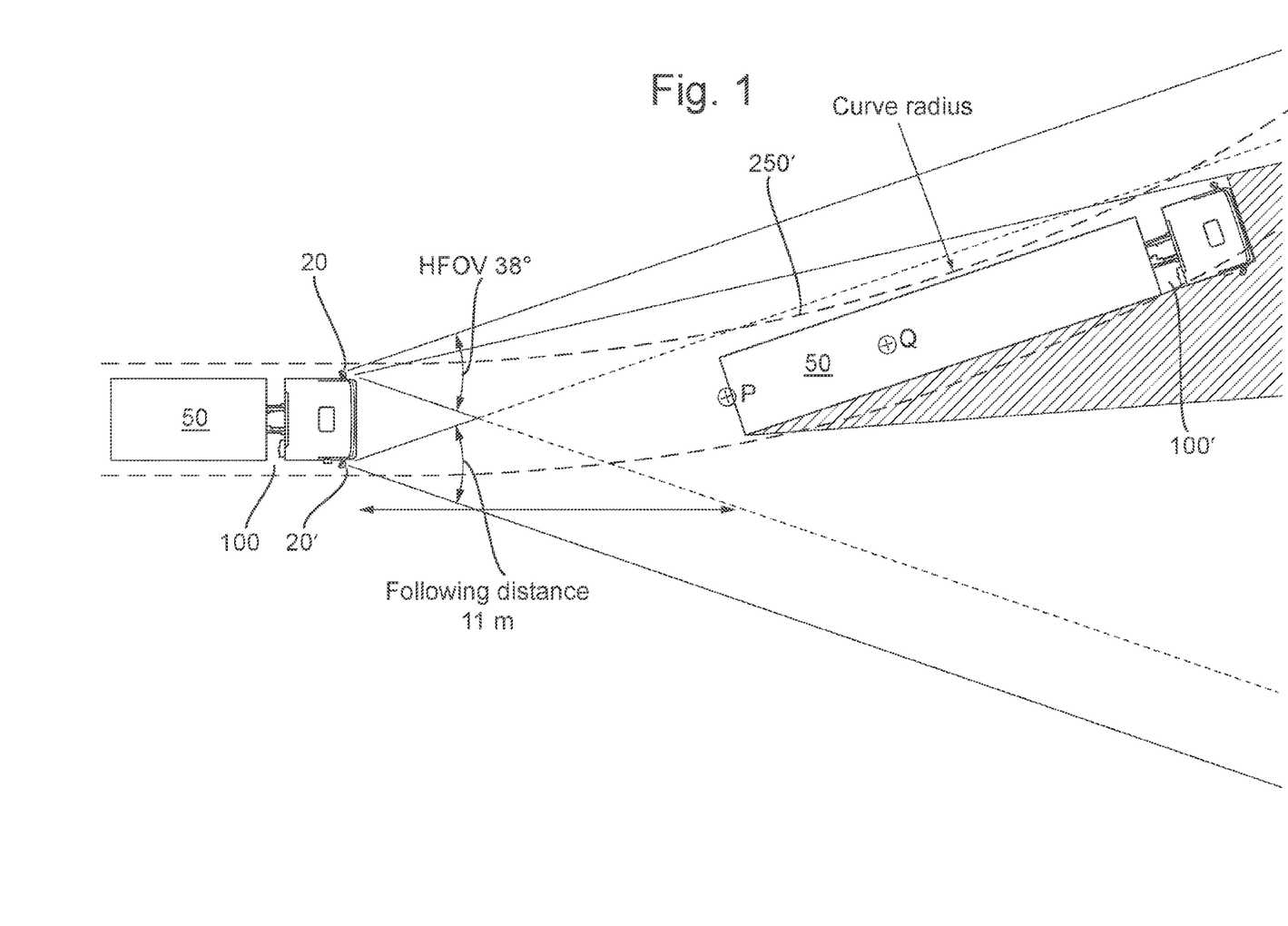
FIG. 1 shows a schematic setup of guiding of a motor vehicle on the basis of image data when (semi-)autonomously driving the motor vehicle in platooning formation following a leading vehicle.

In FIG. 1 a setup is shown according to an embodiment of the invention that refers to an improvement of the known state-of-the-art as described in PCT/NL2017/050285. While for the invention, the presence of a forward looking camera is not essential, in this embodiment a motor vehicle 100 is illustrated equipped with an improved camera set up. The vehicle 100 is driven in platooning formation following a trailer 50 of a leading vehicle 100'. The distance of the following vehicle to its predecessor may be automatically controlled via a so-called Cooperative Adaptive Cruise Control (CACC) that uses signals from on-board cameras and radars to measure the headway distance and received V2V communication messages transmitted by the lead vehicle and containing information on actual deceleration/acceleration to enhance the quality, accuracy and response time of said CACC system. Furthermore the driver can be supported in its steering actions to keep the vehicle in its actual lane by an active steering control means e.g. an electric actuator connected to the steering shaft in order to superimpose additional steering torques to the driver torque effectively helping the driver to keep the vehicle in its lane intuitively. These Advanced Driver Assist Systems (ADAS) may be referred to as Lane Keeping Assist (LKA). In other fully automated Platooning applications the drive may even take off its hands of the steering wheel. These systems may be referred to as Lane Keeping (LK). In this application the steering (and thus the course or lateral position of the following vehicle is solely controlled by the steering control system, automatically following the course (particularly relevant in case of lane changes) and stay within the desired lane of platooning in a fully autonomous manner. These Lane Keeping (Assist) methods comprise identifying the vehicle's current position relative to a lane side 250' by a forward looking camera 20 mounted in the wing assembly mounted on a vehicles first front side location, preferably at or on or near to the vehicles side mirror position. A further forward looking camera mounted in a wing assembly 20' can be mounted on the vehicles second front side location opposing said vehicles first front side location, relative to the vehicles length axis. The forward looking cameras 20, 20' may provide a reference lateral distance value to the steering controller relative to an observed first and/or second lane side. In this setup forward looking camera's 20, 20' define a dual camera basis larger than the vehicles width, i.e. first and second detectors are spaced apart over a distance equal or wider than the vehicle's width.

In the depicted embodiment, the forward looking cameras 20, 20' may be further equipped to provide an image of the leading vehicle located in front of the vehicle. The steering controller may thereby control the steering system to steer the vehicle according to reference value derived from said image which is particularly relevant for performing lane changes in the platoon as whole. The same camera can thus be used to determine the position of the trailer of the preceding vehicle in the platoon apart from determining its own lateral position with respect to the lanes which is important for stable feedback control of the lateral ego-motion in the sense of Lane Keeping. For longitudinal control, the proposed method has the advantage of providing a stereo camera view with a large base (distance between the cameras). The forward looking camera mounted in the wing assembly 20 can thus be equipped to image a reference point P at the back of the trailer of the leading vehicle 100' located at a forward distance. This is a distance typically much smaller than 15 m, typically about 5 to 10 meters. In this way a vehicle inter-distance or headway can be calculated relative to the leading vehicle in a stereo image derived from said opposed forward looking camera mounted in the wing assemblies 20, 20' and favorably be used to enhance the quality accuracy of the ACC based headway control system that uses a central middle camera and radar to measure the following distance as input. Depending on the technical implementation concept the middle camera and radar can even be eliminated and consequently completely be replaced by said two camera wing assemblies.

Figure 2:
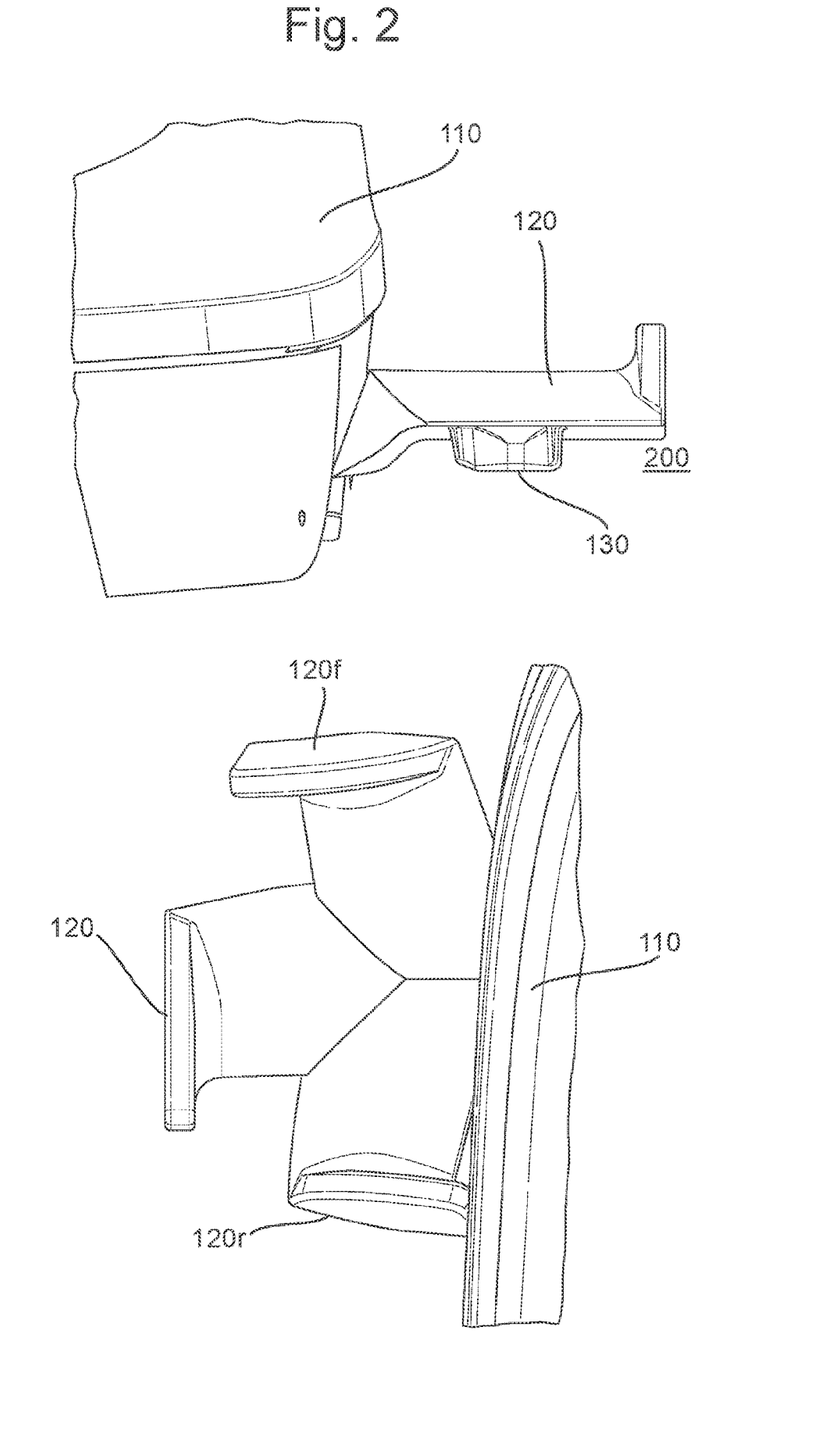
FIG. 2 shows a detailed view of a camera system that is mounted with a hinge mount allowing for folding rearward and forward with respect to the vehicle body.

In FIG. 2 a more detailed view is given of a wing assembly 200 mounted on the vehicle's front side location 110. The wing assembly 200 comprises a wing 120 and a forward looking camera 130 mounted in the wing. The wing 120 can preferably be hinged in forward 120f and rearward 120r traveling directions. For example, in the extending operational position, the wing 120 does not extend further than the reglementary side extension for the side mirrors, and can even form a part of it, or can be a separate assembly mounted in alignment with the side mirrors. Furthermore, the conventional side mirrors can even be replaced by the camera wing units when further backward and downward looking cameras are integrated in the assembly. These systems, referred to as "e-Mirrors" are equipped with displays in the vehicle compartment, typically at the location of the A-pillars to provide the driver with a view on the road near and extending back to the vehicle. Upon incidental impact, e.g. when a vehicle scrapes a wall or another vehicle, the hinge mount of the assembly rotates the wing assembly to a smaller extension, forward or rearward, depending on the impact direction. In another application the rotation of the wings may be actively adjusted by an hinge integrated motor device. In this case the driver does not need to climb outside his vehicle, which is particularly relevant for commercial vehicles where the wing assemblies are typically located at a distance 3-4 m above ground, to manually fold the mirrors towards the cabin for the purpose of narrow corridor maneuvering and/or close distance parking next to walls or other vehicles.

Figure 3A:
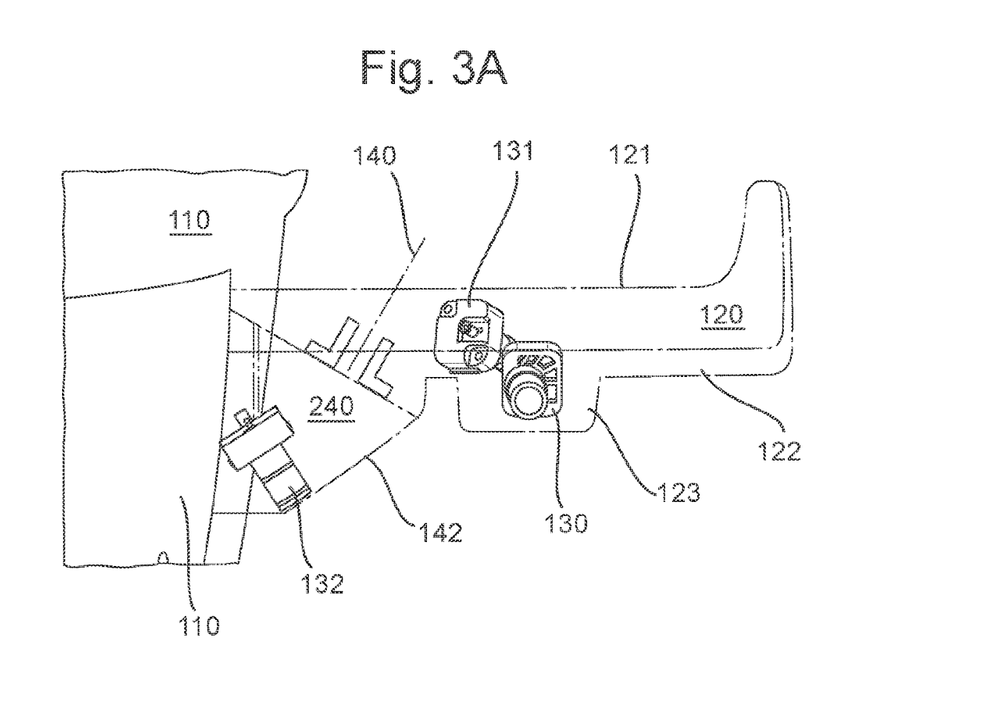
FIGS. 3a and 3b show a base mount and a hanging hinge mount respectively.

The hinge 240 illustrated in FIG. 3A has a fixed part 142 that is fixed to the vehicle's side 110, and a further downward looking camera 132 is provided in the fixed part 142. The wing assembly 120 may additionally provide room for housing a rearward looking camera 131. The hinge rotational axis is preferably oriented at an angle with the vehicles side 110, in particular, the vertical direction, so that the winge 120 is rotated sidewards and upwards when impacted. This rotational orientation minimizes damage since part of the impact energy is diverted by rotating the mirror out of the impact direction. The design of FIG. 3A has a relative advantage over the design of FIG. 3B, in that the hinge mount can be provided more robustly as more coverage area (in the same design space) between the vehicle body on the one hand and rotatable wing on the other hand is available. Furthermore the wing assembly 120 can be designed with a top wing face 121 and an opposed bottom wing face 122. The top wing face has a flatter side than the bottom wing face providing an advantageous aerodynamic design to minimize the air drag of the complete wing assembly and still have sufficient design space available to accommodate additional components like cameras in the armature. In addition, the flatter top side can be conveniently provided as a flattened detachable cover (see FIG. 4). In the advantageous design of FIG. 3A, the flat wing assembly 120 has a bottom wing face 122 and a protruding portion 123 protruding from the bottom wing face 122 to house a forward looking camera. The flat wing shape minimizes hindering or stalling of the travel wind speed (avoid separation from the wing surface), so that optimal wind speeds are provided for directing air flow above and below the wing assembly.

Figure 3B:
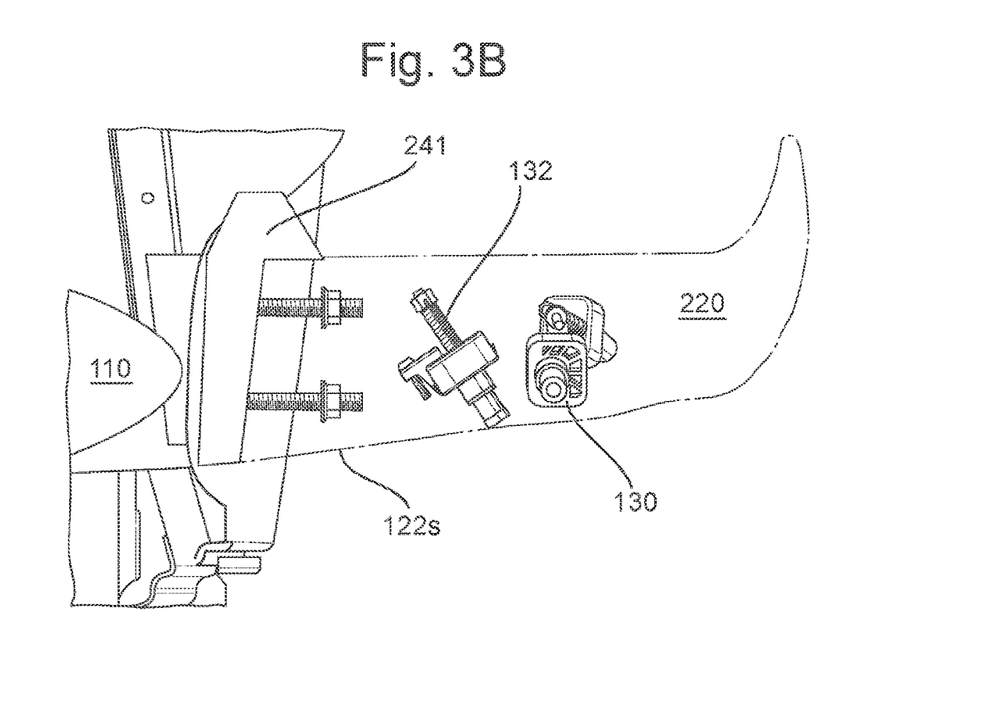

The top hinge mount design 241 of FIG. 3B leaves a bit more room for flattening the wing shape 122s to the side of the vehicle 110. This can be used as a trade off for increasing the height of the wing assembly 220, that may additionally house a downward looking camera. However, a larger extension in height will generally produce more drag. The hinges 240, 241 of FIGS. 3A and 3B both preferably comprise openings for passing through camera and telemetry cables so that a compact design is provided for the hingable wing assembly 120, 220.

Figure 4:
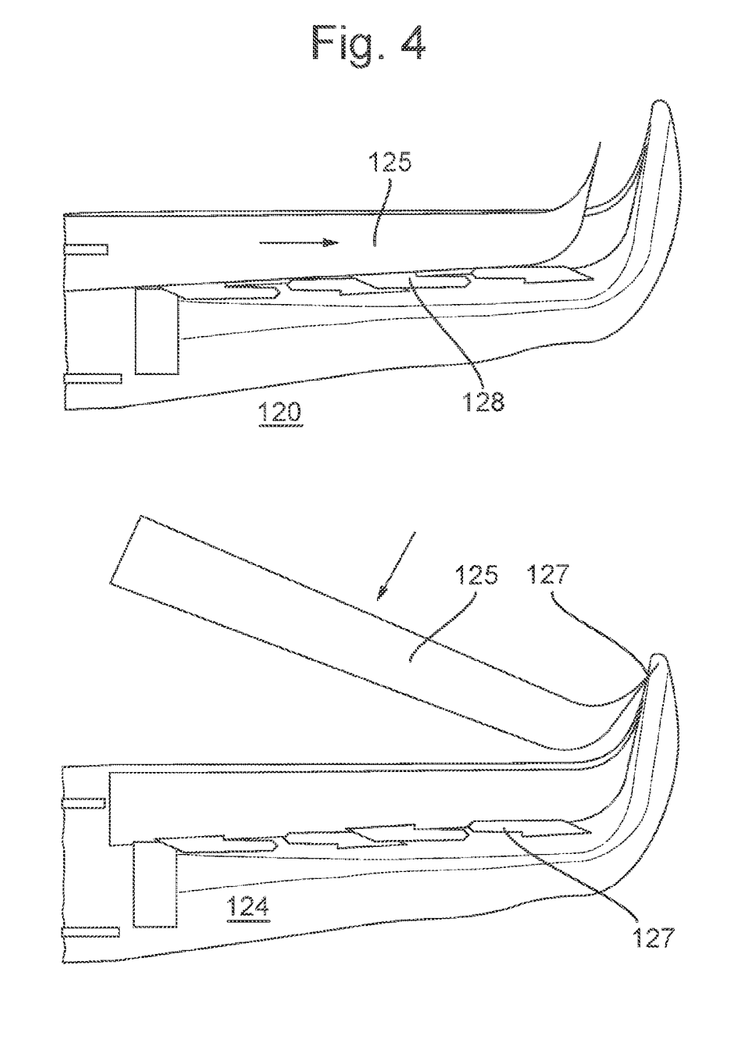
FIG. 4 shows an embodiment wherein the wing assembly has winglet and a top wing cover plate

In a further embodiment illustrated in FIG. 4, the wing assembly 120 is top surface 121 provided as a detachable cover plate. This has the benefit of easy servicing and installing of the telemetry, for example when adjusting the camera system to a specific vehicle, or when repair is needed. The cover plate 125 forming the top wing face can be mounted by clamping lids. In an embodiment the lids may slide in a correspondingly shaped groove provided in the lower part 124 of the wing assembly. Alternatively, clamping hooks 127 may seize a corresponding clamp arranged in the bottom portion. The lids 128 and the grooves may be designed such that the cover is clamped with sufficient downforce when in mounted position, so that water ingress is prevented. An elastic sealing rim (not shown) which is effectively compressed by this down force may further prevent water ingress. Preferably, the cover 125 is mounted by non conductive parts, e.g plastic screws or a clamping hook 127, alternatively or in addition to lids 128, to prevent interference with one or more digital communications antennas that may be mounted in the wing assembly 120. In case of application of fastening screws the mounting orientation may be chosen favourably in horizontal or lateral direction (in parallel to the wing cover plate) e.g one at the winglet from inside to outside and one or more at the hinge side (the latter screws may be steel based as no interference with the communication antenna signal transmission performance is present). The advantages of such a screwing system (not shown in FIG. 4) are that the probability of water ingression is further reduced and no direct visual view on this screw spots is possible while standing on the ground outside the vehicle. Moreover this horizontal screwing system supports driving the top cover plates in its clamping lids effectively increasing the down force that connects the wing shells (i.e. body and cover) together and compresses the elasting sealings.

Figure 5A:
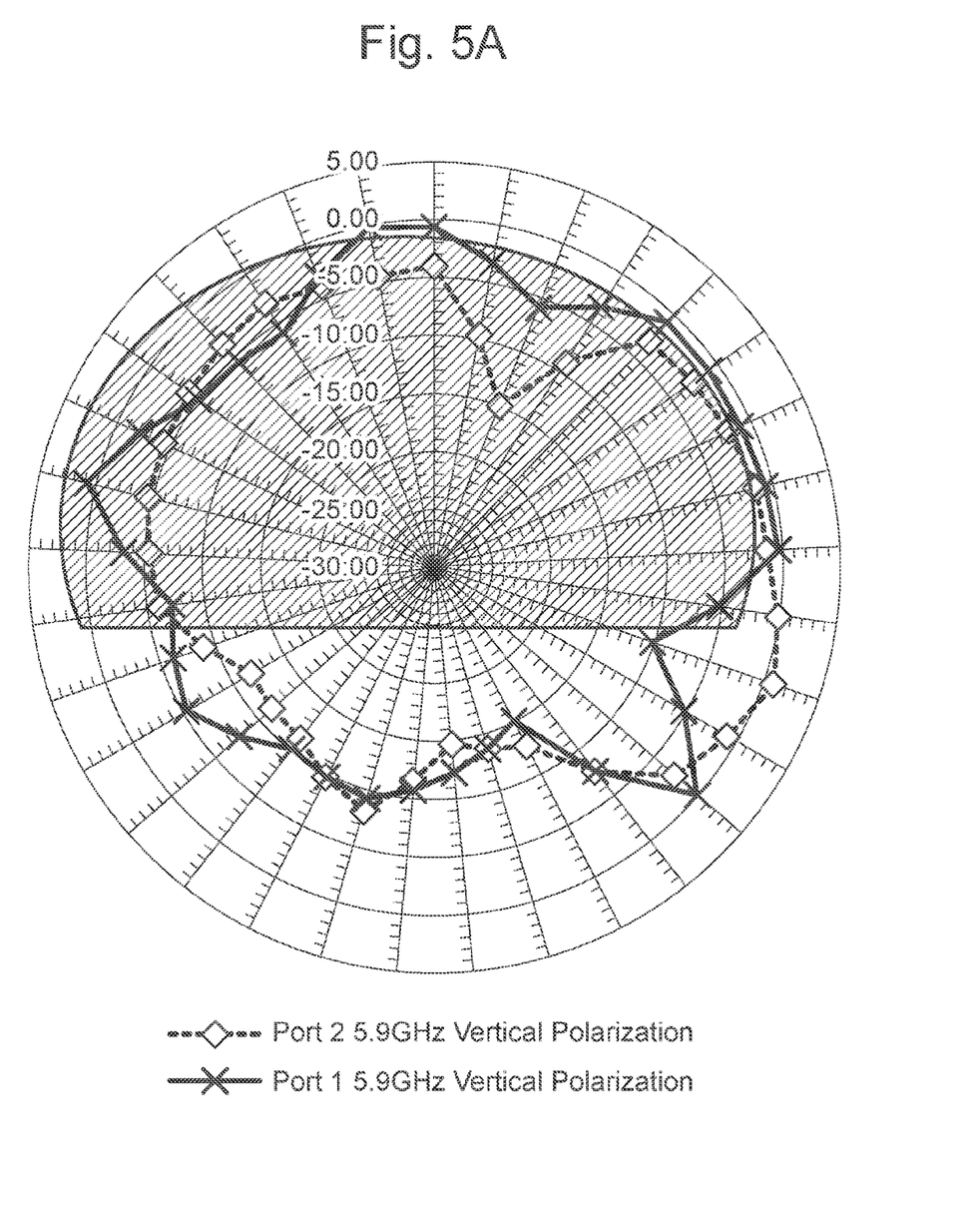
FIG. 5 shows an embodiment showing a wing assembly with communication-antennas mounted in a winglet part.
Figure 5B:
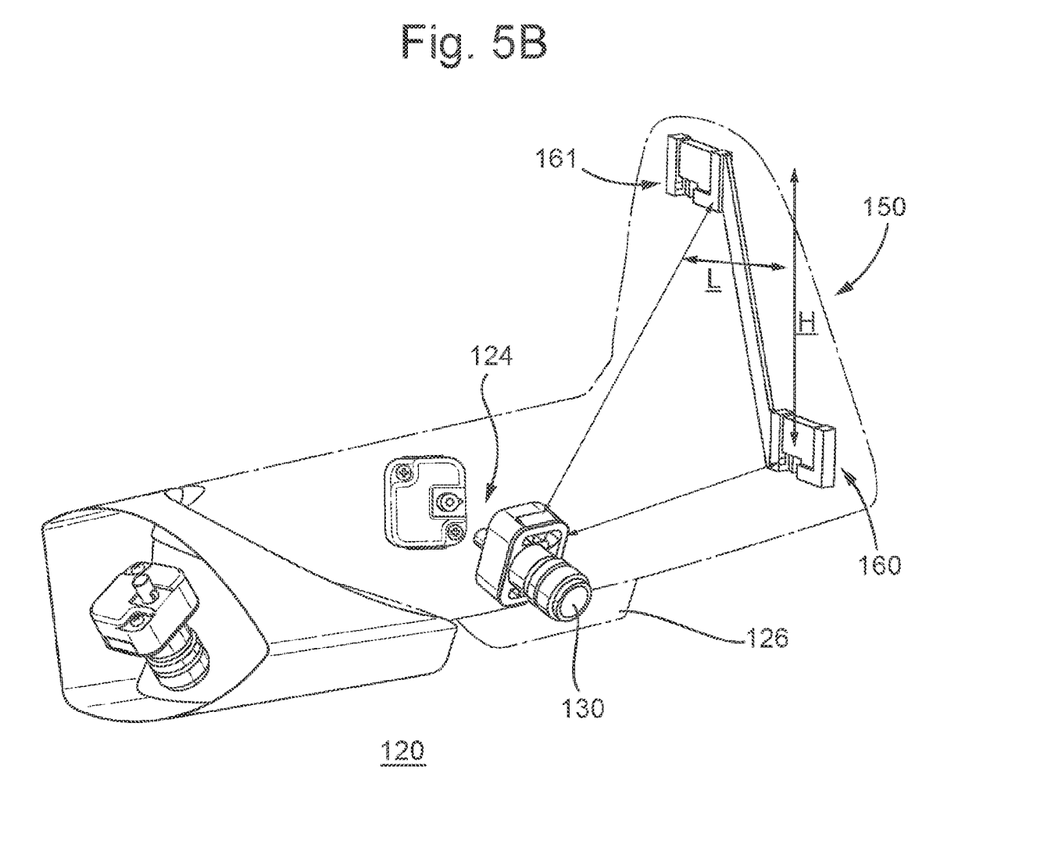

In preferred embodiments shown in FIGS. 4 and 5 the wing assembly 120 has an upstanding side portion 150 that houses the one or more digital communications antennas 160, 161. Conversely, the side portion 150 could be designed as a profile pointing downward or a profile that points in a direction at an angle β relative to the horizontal plane H of the bottom portion of the wing.

In the shown embodiment of FIG. 5 the upstanding side 150 houses a first antenna 160 at a first height, and a second antenna 162 at a second height, different from the first height. This height difference H is important for providing sufficient distance between the antenna's optimizing transmission and reception quality, by providing good coverage, low interference and good diversity properties of the communication signals at the used radio frequencies of around e.g. 5.9 GHz. The small form-factor antenna can be based on an adapted di-pole antenna, for which no external groundplane is needed. Placing it in a side-wing (or mirror) whilst taking care of sufficient distance to the (metal) cabin-side and other conducting components, roughly a half-donut shaped radiation pattern results, favorable for receiving signals from trucks driving in front and back, directly, or reflected from road-guardrails. In addition the winglet shape 150 provides for a horizontal distance L further improving the antenna characteristic, which should be sufficient to optimally couple with a corresponding receiver of a leading and/or trailing vehicle in platoon arrangement, for instance. The effective resulting distance (composed by vertical height H and horizontal distance L) between the two communication antennas is preferably in the order of, or larger than 2 times the wavelength (ie larger than ca. 10 cm) to provide the benefits described above. Furthermore, for the same reason, the communication antennas are placed away from metal or aluminium structural parts, like screw, camera housings, hinge bearing systems, vehicle body parts etc. Also the forward and backward looking cameras are placed at similar distances from the communication antennas, housed in the winglets. A further advantage of placing the communication antennas in the winglet is that this spot dictates the widest position outside the vehicle body. Particularly in case of commercial vehicle applications with truck-trailer combinations this setup optimizes a direct line of sight of the communication antennas from one vehicle to the other vehicles in the platoon along the trailers, either transmitting signals to the front and by-passing the trailer of the predecessor or to the following vehicle in the back and by-passing its own trailer. This contributes to establishing a robust, undisturbed high performance wireless V2V communication system which is important for facilitating short distance platooning. As an example of good design in FIG. 5 a laboratorium measurement result of the WiFi-p transmission performance of an preferred embodiment of a wing assembly with two antennas in the winglet and three cameras in side wing armature is shown in the graph A on the bottom right hand side. The plot demonstrates the broadcasting attenuation (units are in dB) as defined in the horizontal plane of the wing assembly. The vertical axis refers to the lateral orientation of the vehicle and the horizontal axis to the longitudinal orientation of the vehicle. Both antennas show a broad homogeneously spread stable transmission quality. Only the antenna at port 2 has local dip, probably caused by the position of closest camera. This dip is acceptable as it only slightly reduces the transmission performance in lateral direction. For Platooning V2V communication applications the horizontal direction is of primary importance to have excellent communication transmission quality (in terms of range, stability, reliability and robustness). For safety reasons, the system is provided with separate double provisions, to provide a redundant fail safe mechanism of the communication system between vehicles.

This is especially important when the safety of the application is critically dependent on the vehicle-to-vehicle communication system.

The wing assemblies of FIGS. 4 and 5 are designed with the side portion 150 shaped as a winglet, that on the one hand provides for a flat wing geometry, reducing air drag resistance, but at the same time providing sufficient vertical and horizontal space to provide for a housing of the antennas. Alternatively, the antenna's 160, 161 are placed in the body 124 of the wing assembly 120, but this increases the vertical extension of the wing shape. Also the winglet shape may aerodynamically enhance the air flow speed above and below the wing assembly as it stabilises the air pressures above and underneath the wing thereby positively contributing to a stable homogeneous laminar airflow along the wing surface reducing the risk of flow separation. In a further advantageous embodiment, the winglet is angled relative to the length orientation of the vehicle, e.g. diverges from the vehicle in the rearward direction.

Figure 6:
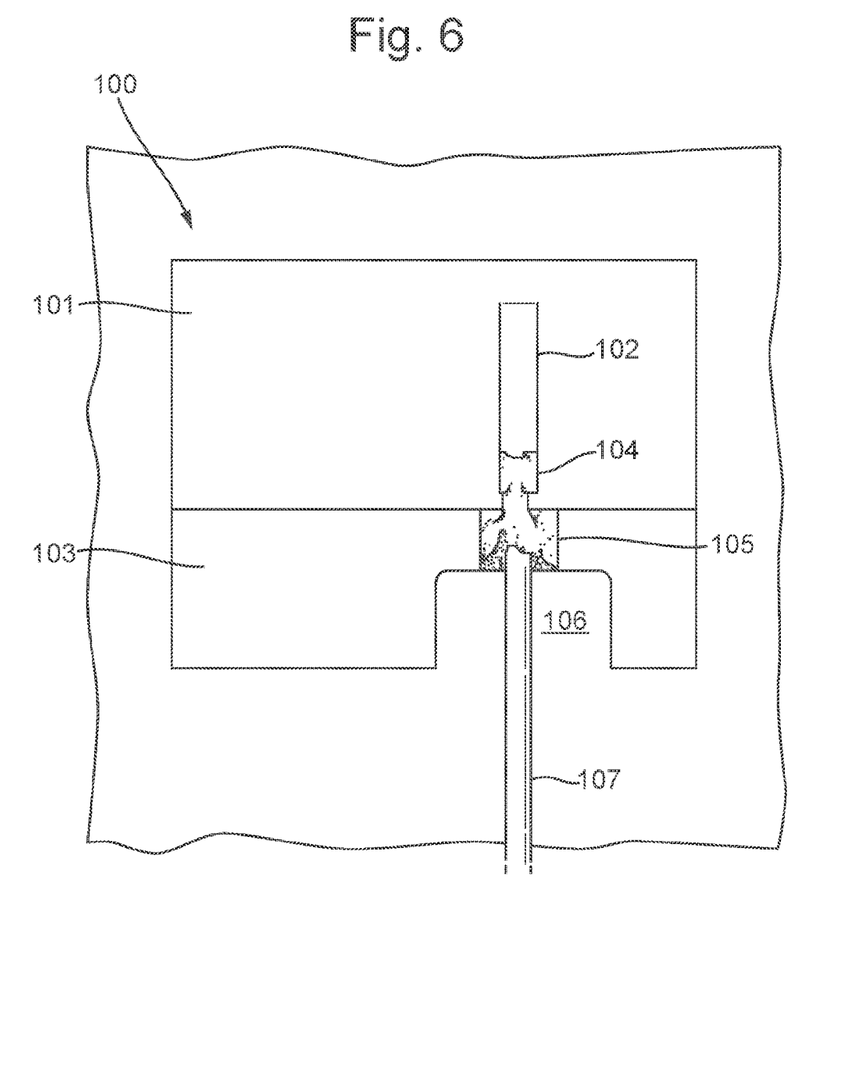
FIG. 6 shows a further embodiment of a WiFi-p antenna suitable for installation within the wing assembly.

FIG. 6 shows a front view of a further embodiment of one WiFi-p antenna suitable for installation within the wing assembly. A planar antenna 100 comprises a substrate 101 having at one side a first conductor 102, a second conductor 103, an air insert 106, two soldering connections 104 and 105 respectively and a coaxial cable 107.

The substrate has an electric permittivity different from air, e.g. larger than 3, for example a relative permittivity of 4. First conductor 102 is set for an electrical length of a quarter wavelength of the communication frequency; second conductor 103 is set for an electrical length between a quarter wavelength and a half wavelength of the communication frequency. Air insert 106, has a height and width smaller than the second conductor. Soldering connections 104 and 105 connect the first (102) and second conductor (103) to an antenna cable 107, e.g. coaxial cable. Preferably first part of the cable 107 is positioned in line with the first conductor 102.

The antenna design does not have a ground plane and does not require any connection to the chassis of the vehicle. The novel construction suppresses unwanted common mode currents onto the coaxial cable which results firstly in a stable input impedance and secondly to an omnidirectional radiation pattern with high efficiency and thirdly leaking currents via the coaxial cable to the electronic parts are suppressed.

The invention claimed is:

1. A wireless vehicle to vehicle communication system arranged for mounting on a vehicle's front side location, equipped to provide inter vehicle communication comprising:
   a wing assembly arranged for mounting on the vehicles front side location;
   wherein the wing assembly houses one or more digital communications antennas,
   wherein the wing assembly has a side portion that houses a first antenna at at least one of a first height or a first horizontal position, and a second antenna at at least one of a second height or a second horizontal position different from the at least one of the first height or the first horizontal position in order to optimize transmission and reception quality,
   wherein the wing assembly comprises a hinge mount that hinges the wing shaped assembly in forward and rearward traveling directions, and
   wherein the hinge has a base part that comprises openings for passing through camera and telemetry cables.

2. The wireless vehicle to vehicle communication system according to claim 1, further comprising one or more cameras mounted in the wing assembly.

3. The wireless vehicle to vehicle communication system according to claim 1, wherein the wing assembly has a top wing face and an opposed bottom wing face.

4. The wireless vehicle to vehicle communication system according to claim 1, wherein the one or more digital communication antennas are located at an outer side of the wing assembly farthest away from the vehicle and at a distance from the wing assembly integrated cameras.

5. The wireless vehicle to vehicle communication system according to claim 4, wherein the wing assembly is provided with a detachable cover plate.

6. The wireless vehicle to vehicle communication system according to claim 5, wherein the cover plate is fixed to the wing assembly by clamps.

7. The wireless vehicle to vehicle communication system according to claim 1, wherein the one or more digital communications antennas are antennas for a vehicle-to-vehicle communication system operating at approximately a 5.9 GHz frequency.

8. The wireless vehicle to vehicle communication system according to claim 1, wherein the side portion is shaped as a winglet.

9. The wireless vehicle to vehicle communication system according to claim 1, wherein the wing assembly is provided with a detachable cover plate.

10. The wireless vehicle to vehicle communication system according to claim 9, wherein the cover plate is fixed to the wing assembly by clamps.

11. The wireless vehicle to vehicle communication system according to claim 1, wherein the wing assembly is integrated as digital communication antennas in an external rearward looking front side mirror or mirror replacing means.

12. A wireless vehicle to vehicle communication system arranged for mounting on a vehicle's front side location, equipped to provide inter vehicle communication comprising:
   a wing assembly arranged for mounting on the vehicles front side location;
   wherein the wing assembly houses one or more digital communications antennas,
   wherein the wing assembly has a side portion that houses a first antenna at at least one of a first height or a first horizontal position, and a second antenna at at least one of a second height or a second horizontal position different from the at least one of the first height or the first horizontal position in order to optimize transmission and reception quality, and
   wherein the wing assembly is provided with a detachable cover plate.

13. The wireless vehicle to vehicle communication system according to claim 12, wherein the cover plate is fixed to the wing assembly by clamps.

14. The wireless vehicle to vehicle communication system according to claim 12, further comprising one or more cameras mounted in the wing assembly.

15. The wireless vehicle to vehicle communication system according to claim 14, wherein the wing assembly comprises a hinge mount that hinges the wing shaped assembly in forward and rearward traveling directions.

16. The wireless vehicle to vehicle communication system according to claim 15, wherein the hinge has a base part that comprises openings for passing through camera and telemetry cables.

17. The wireless vehicle to vehicle communication system according to claim 12, wherein the one or more digital communication antennas are located at an outer side of the wing assembly farthest away from the vehicle and at a distance from the wing assembly integrated cameras.

18. The wireless vehicle to vehicle communication system according to claim 12, wherein the one or more digital communications antennas are antennas for a vehicle-to-vehicle communication system operating at approximately a 5.9 GHz frequency.

19. The wireless vehicle to vehicle communication system according to claim 12, wherein the side portion is shaped as a winglet.

20. The wireless vehicle to vehicle communication system according to claim 12, wherein the wing assembly is integrated as digital communication antennas in an external rearward looking front side mirror or mirror replacing means.

* * * * *